March 22, 1960 — G. B. HILL — 2,929,192
SIDE DELIVERY RAKE
Filed Nov. 17, 1958 — 2 Sheets-Sheet 1

INVENTOR
GEORGE B. HILL
Joseph Allen Brown
ATTORNEY

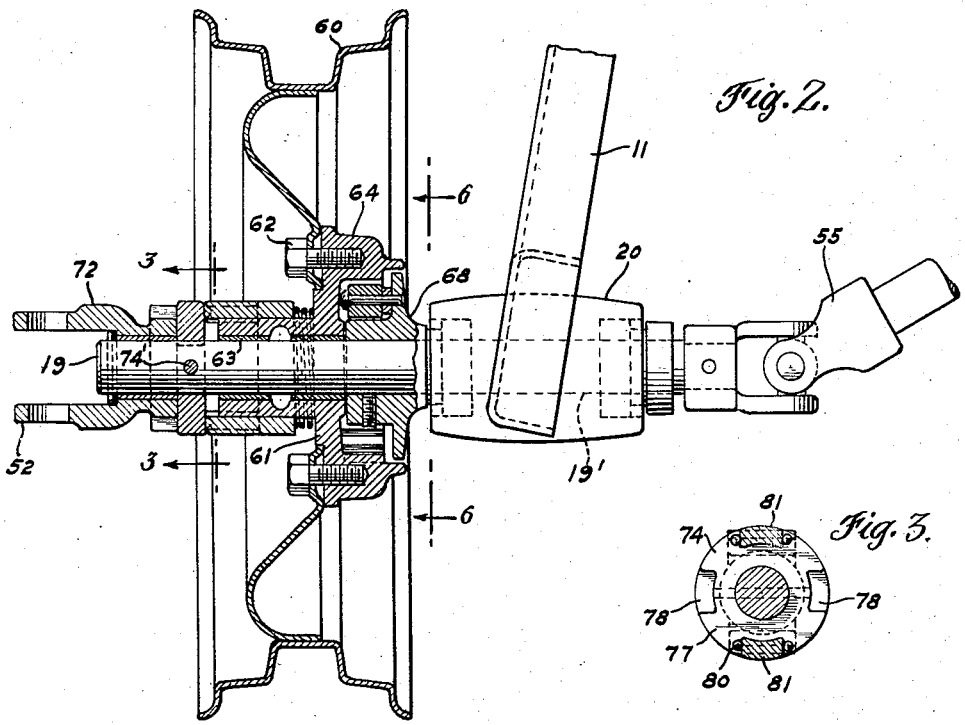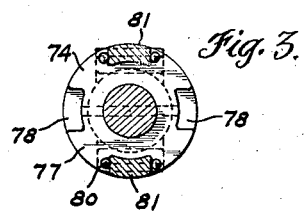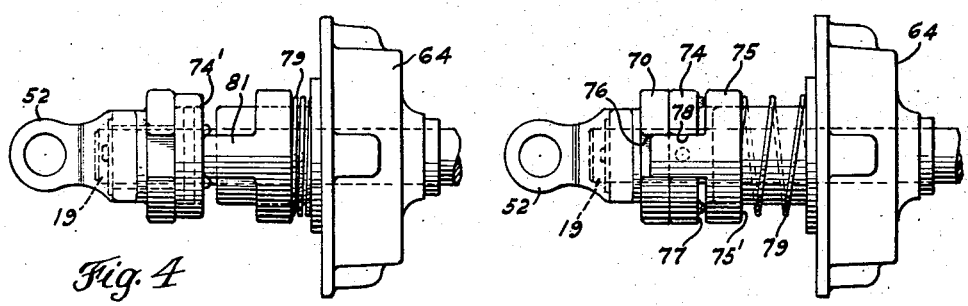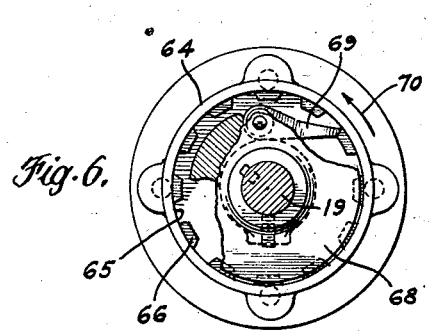

United States Patent Office 2,929,192
Patented Mar. 22, 1960

2,929,192

SIDE DELIVERY RAKE

George B. Hill, Mansfield, Ohio, assignor to Sperry Rand Corporation, New Holland, Pa., a corporation of Delaware Application November 17, 1958, Serial No. 774,471

10 Claims. (Cl. 56—377)

This invention relates generally to side delivery hay rakes, and more particularly to a side delivery rake of the type shown in U.S. Patent No. 2,781,626 issued February 19, 1957.

One object of this invention is to provide an improved side delivery rake, of the type shown in the above patent, which will rake more efficiently.

Another object of this invention is to provide an improved side delivery rake of the character described having a simple main frame structure possessing less structural material than was heretofore required.

Another object of this invention is to provide a side delivery rake of the character described having improved gauging whereby the disposition of the raking reel is more responsive to variations in ground conditions thereby providing cleaner raking.

Another object of this invention is to provide a side delivery rake of such structure that breakage of tines during operation of the rake is much less than with similar rakes of prior design.

Another object of this invention is to provide a side delivery rake which, because of greatly improved gauging, protects the overall rake structure from undesirable shock loads and resulting wear and tear.

A still further object of this invention is to accomplish the foregoing objects and nevertheless have a rake powered by a pair of ground wheels, each of which is connected to the raking reel to drive it.

Other objects of this invention will be apparent hereinafter from the specification and from the recital in the appended claims.

In the drawings:

Fig. 2 is an enlarged, fragmentary part plan view, part section taken on a horizontal plane through the center of the rear wheel of the pair of ground wheels, showing the connection between the wheel and a shaft which it drives, and the structure of the clutch used for controlling the drive to the reel of the rake;

Fig. 3 is a section taken on the line 3—3 of Fig. 2 looking in the direction of the arrows;

Figs. 4 and 5 are side elevations showing the rake clutch disengaged and engaged, respectively; and Fig. 6 is a section taken on the line 6—6 of Fig. 2, looking in the direction of the arrows and showing the overrunning drive employed in each rake wheel.

Figure 1:
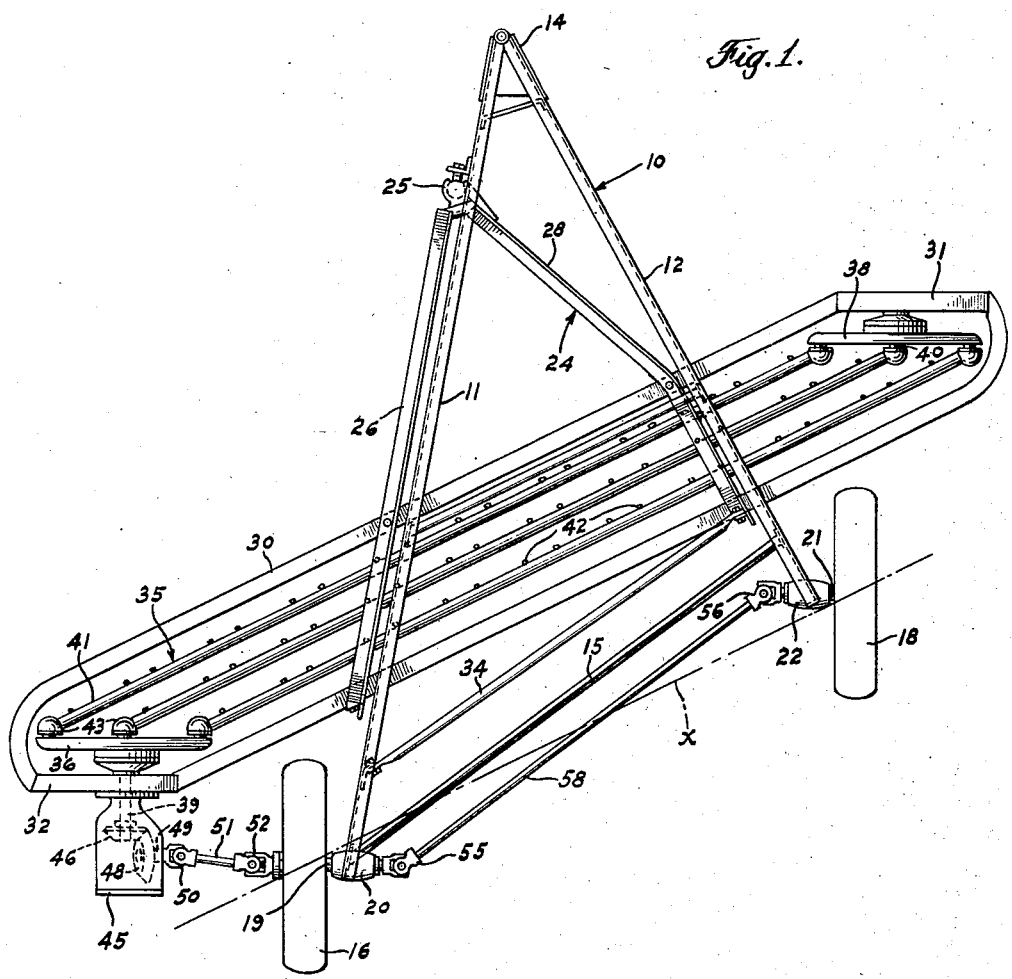
Fig. 1 is a plan view of a side delivery rake constructed according to this invention, and showing, in particular, the novel disposition of the ground wheels.

Referring now to the drawings by numerals of reference, and particularly Fig. 1, 10 denotes an arched main frame which when viewed in plan is V-shaped. Frame 10 has a pair of rearwardly extending legs 11 and 12, the leg 11 being substantially longer than leg 12. At the forward end of the frame, or the apex of the V, a hitch or clevis member 14 is provided whereby the frame may be coupled to the drawbar of a tractor or the like so that the rake may be towed. The rear ends of legs 11 and 12 are interconnected by a crossbar 15, provided to give rigidity to the main frame structure.

Frame 10 is supported at its rear end by a pair of laterally spaced ground wheels, namely rear wheel 16 and intermediate wheel 18. Such wheels are rotatable about fixed parallel axes spaced in a forward-rear direction and transverse to the line of draft of the rake. Wheel 16 is connected to leg 11 of the frame 10 by means of a shaft 19 having an inboard end 19' (Fig. 2) which carries a barrel-shaped bearing-block 20 to which the rearward end of leg 11 is connected. Wheel 18 has a shaft 21 having a bearing-block 22, similar to block 20, and to which the rearward end of leg 12 is connected. Thus, it is seen that main frame 10 is supported at three points, namely, hitch 14 which supports the forward end of the rake and wheels 16 and 18, which support the rear end of the rake.

Mounted on main frame 10 and suspended therebeneath is a sub-frame 24 which, like the main frame, is generally V-shaped in plan. The apex of the V faces forwardly and is pivotally connected through ball and socket 25 to a forward portion of leg 11 of the main frame. Sub-frame 24 has a member 26 which extends rearwardly and generally parallel to leg 11 and a member 28 which extends rearwardly and toward leg 12 and then a portion extending parallel thereto. The rear end of the sub-frame is supported by means, not shown. However, such supporting means may be similar to that shown in the aforementioned U.S. Patent No. 2,781,626.

Carried on sub-frame 24 is a rake basket 30 which extends diagonally relative to the line of draft of the rake. The rake basket has a forward end 31 and a rear or trailing end 32. As shown in Fig. 1, the leading and trailing ends of the rake basket project laterally of the frame structure of the rake. Rake basket 30 is suitably affixed to the sub-frame 24 and it is braced in proper position relative to the main frame 10 by a tension stabilizer bar 34 which extends from adjacent the rearward end of leg 11 of frame 10 to a point on the forward end of the rake basket 30, as shown.

Rotatable on basket 30 is a raking reel 35 comprising a pair of spiders 36 and 38 rotatable about laterally spaced, fore-and-aft extending axes. Spider 36 is rotatable on a shaft 39 journaled in the rear end 32 of the rake basket. Spider 38 is rotatable on a shaft 40 journaled in the forward end 31 of the rake basket. Extending between spiders 36 and 38 are rake bars 41, each of which carries a series of rake tines 42. The end of each bar is connected to the adjacent spider and supported thereon by a bearing structure 43 which may be similar to that shown in U.S. Patent No. 2,777,275.

As shown in Fig. 1, a line X projected between the centers of rotation of the respective ground wheels, extends parallel to the diagonal extension of the rake reel and axis of rotation thereof.

Projecting rearwardly from the rear end 32 of basket 30 is a gear box 45 housing beveled gears 46 and 48. Gear 46 is connected to reel 35 through shaft 39. When the gear 46 is driven, shaft 39 and the reel 35 are rotated, the rotation of the reel being such that when hay is raked, it is delivered from right to left in Fig. 1. The beveled gear 48 meshes with gear 46 and is connected to a shaft 49 having a universal joint 50 at an end outside the gear box. Shaft 49 is connected through joint 50, a shaft 51, and a universal joint 52 to drive shaft 19. The inboard end 19' of the drive shaft carries a universal joint 55 connected to a second universal joint 56 through shaft 58. The universal joint 56 connects to the drive shaft 21 in ground wheel 18.

A conventional pawl and ratchet one-direction drive connection is provided between each ground wheel and its respective drive shaft. The structures employed in each wheel are similar; therefore, only the driving structure from the wheel 16 will be described.

As shown in Fig. 2, wheel 16 includes a frame 60 connected to a hub 61 by bolts 62. Hub 61 is rotatable on a bushing 63 on drive shaft 19. The hub 61 has an integral housing 64 (Fig. 6) having an opening 65 provided with angularly spaced teeth 66. Keyed to shaft 19 is a member 68 which carries a pawl 69 engageable with the teeth 66. The mounting of the pawl 69 and the shape of the teeth 66 is such that wheel 16 is capable of driving shaft 19 in one direction only, as indicated by the arrow 70, Fig. 6. If wheel 16 rotates in the opposite direction, the pawl 69 will merely skip over the teeth 66.

When wheel 18 rotates on forward movement of the rake, shaft 21 is driven through a ratchet drive similar to that described. Shaft 21 drives through universal 56, shaft 58 and universal 55 to the drive shaft 19. In like respect, when wheel 16 rotates on forward movement of the rake, a driving force is directed to the shaft 19. Thus, both ground wheels drive shaft 19 and through shaft 51 and gearing 49—46, the reel 35.

In order that the drive to the raking reel 35 may be disconnected, when the rake is to be towed on a highway, for example, a manually operable clutch is provided. Such clutch comprises three parts, namely member 70 which is integral with one part 72 of universal 52, a ring 74 connected to shaft 19 by a pin 74' and an axially slidable coupler 75. Member 70 and ring 74 each have diametrically opposed slots, the pair of slots in member 70 being denoted 76 and the slots in ring 74 being denoted 78. Coupler 75 is biased toward ring 74 by a spring 79 interposed between housing 64 and one side face 75' of the coupler member. The axial face 77 of ring 74 facing coupler 75 is provided with pairs of spaced buttons 80 adapted to receive the ends of lugs 81 on the coupler (Fig. 3).

When coupler 75 is disposed with the ends of lugs 81 abutting against side face 77 of ring member 74 and between the buttons 80, spring 79 is compressed. No drive is imparted to the shaft 51 and reel 35. However, if the coupler 75 is shifted slightly to the right of Fig. 4, the lugs 81 may be released from buttons 80. Then by angularly turning the coupler the lugs can be brought into register with the slots 78 in ring 74 and a coupling accomplished. The spring 79 will operate to shift member 75 toward ring 74 wherein the lugs 81 will be projected into the slot 78. If the slots 76 in member 70 of universal element 52 are in register with the slots 78, lugs 81 will be projected through both member 70 and ring 74 to couple these parts. In the event the slots 76 and 78 are out of register, when the rake is towed, a small amount of rotation of the shaft 19 and thus ring 74 and coupler 75 relative to member 70 will soon bring lugs 81 into register with the slots 76 whereupon the coupler will shift axially and provide a connection.

Due to the fact that ground wheels 16 and 18 are close to the basket 30 and the raking reel 35, close gauging is provided and the tines 42 carried on the raking bars 41 are less subject to breakage. Further, the wheels, particularly forward wheel 18 will render the entire raking structure quickly responsive to ground changes when the rake is operated so that the raking reel will not "plow" into the ground transmitting forces through the rake bearings 43 and spiders 36—38 as well as to other parts of the structure.

When a turn is made, one wheel will rotate faster than the other wheel. In some instances, the inboard wheel will rotate rearwardly as a turn is being made. This creates no problem since the ratchet drives in the wheels drive in one direction only, and permit free reverse rotation.

Since both ground wheels 16 and 18 are connected to the raking reel, they both contribute to the drive of the reel. While it is necessary to provide angles in the drive from one drive wheel to the other drive wheel, such is readily accomplished with the structure employed.

Concerning the frame 10, advancing the right wheel forwardly reduces the amount of frame structure required and saves material in the construction of the rake. The manually operable clutch provides a ready means whereby the drive to the raking reel can be readily connected and disconnected.

While this invention has been described in connection with a particular embodiment thereof, it will be understood that it is capable of further modification and this application is intended to cover any variations, uses or adaptations of the invention following, in general, the principles of the invention and including such departures from the present disclosure as come within known or customary practice in the art to which the invention pertains, and as fall within the scope of the invention or the limits of the appended claims.

Having thus described my invention, what I claim is:

1. A side delivery rake comprising a frame having a pair of rear supporting wheels and a forward supporting hitch for connection to a tractor or the like, a driven raking means connected to and extending diagonally relative to the line of draft of said frame, each supporting wheel of said pair of wheels being positioned rearwardly of said raking means and in close proximity thereto, said pair of wheels being rotatable about fixed parallel axes transverse to said line of draft and spaced in both a lateral and a forward-rear direction, and drive means connected between both of said wheels and said raking means.

2. A side delivery rake comprising a frame having a pair of rear supporting wheels and a forward supporting hitch for connection to a tractor or the like, a rotatable rake reel connected to and suspended beneath said frame and extending diagonally relative to the line of draft of said frame, each supporting wheel of said pair of wheels being positioned rearwardly of said reel and in close proximity thereto, said pair of wheels being rotatable about fixed parallel axes transverse to said line of draft and spaced in both a lateral and a forward-rear direction, and drive means connected between both of said wheels and said rake reel.

3. A side delivery rake as recited in claim 2 wherein a line projected between the centers of rotation of said wheels is substantially parallel to said rake reel.

4. A side delivery rake adapted for ground travel forwardly comprising a frame, a reel mounted on said frame and extending diagonally relative to the direction of travel thereof, a hitch affixed to the forward end of said frame for connecting the rake to a vehicle, a rear wheel connected to said frame, an intermediate wheel connected to said frame and disposed between said hitch and rear wheel, both of said wheels being rearwardly of said reel and rotatable about fixed parallel axes transverse to said direction of travel and spaced in a forward-rear direction, and means connecting both of said wheels to said reel whereby when said wheels are rotated responsive to said ground travel said reel is rotated.

5. A side delivery rake comprising a V-shaped frame disposed with the apex of the V forward and the ends of legs of the V rearward, one leg end being rearward of the other leg end, a ground wheel connected to each of said leg ends and supporting the rear of said frame above the ground, a hitch fastened to said apex for connection to the drawbar of a tractor or the like, a rotatable reel connected to and suspended beneath said frame and extending diagonally relative to the line of draft of said frame, each supporting wheel of said pair of wheels being rearward of said reel and in close proximity thereto, said pair of wheels being rotatable about fixed parallel axes transverse to said line of draft and spaced in both a lateral and a forward-rear direction, and drive means connected between both of said wheels and said rake reel whereby when said wheels are rotated said reel is rotated.

6. A side delivery rake comprising a V-shaped frame disposed with the apex of the V forward and the ends of legs of the V rearward, one leg end being rearward of the other leg end, a ground wheel connected to each of said leg ends and supporting the rear of said frame above the ground, a hitch fastened to said apex for connection to the drawbar of a tractor or the like, a rotatable reel connected to and suspended beneath said frame and extending diagonally relative to the line of draft of said frame, each supporting wheel of said pair of wheels being rearward of said reel and in close proximity thereto, said pair of wheels being rotatable about fixed parallel axes transverse to said line of draft and spaced in both a lateral and a forward-rear direction, a pair of shafts, one in each of said wheels, means connecting said shafts to their respective wheels to be rotated upon rotation of said wheels in a forward direction, means connecting said pair of shafts, and means connecting one of said shafts to said rake reel.

7. A side delivery rake comprising a V-shaped frame disposed with the apex of the V forward and the ends of legs of the V rearward, one leg end being rearward of the other leg end, a ground wheel connected to each of said leg ends and supporting the rear of said frame above the ground, a hitch fastened to said apex for connection to the drawbar of a tractor or the like, a rotatable reel connected to and suspended beneath said frame and extending diagonally relative to the line of draft of said frame, each supporting wheel of said pair of wheels being rearward of said reel and in close proximity thereto, said pair of wheels being rotatable about fixed parallel axes transverse to said line of draft and spaced in both a lateral and a forward-rear direction, a pair of shafts, one in each of said wheels, an overrunning clutch connecting each shaft to its associated wheel whereby rotation of the wheel in a forward direction rotates its shaft, means including universal joints connecting said pair of shafts, and means connecting the shaft of the rearmost wheel of said pair of wheels to said reel.

8. A side delivery rake comprising a frame supported at its rear end by a pair of ground wheels and at its forward end by a hitch connectable to the drawbar of a tractor or the like, a rotatable rake reel connected to and suspended beneath said frame and extending for rotation on an axis diagonal to the line of draft of said frame, said reel having a rear end and a forward end, each ground wheel of said pair of wheels being positioned rearwardly of said reel and in close proximity thereto, said pair of wheels being rotatable about fixed parallel axes transverse to said line of draft and spaced in both a lateral and a forward-rear direction, one of said pair of wheels being proximate to said reel forward end, the other of said pair of wheels being proximate to said reel rear end, a drive shaft carried on and rotatable responsive to rotation of said one wheel, means connecting said other wheel to said drive shaft to rotate the shaft responsive to rotation of said other wheel, and means connecting said drive shaft to said reel.

9. A side delivery rake comprising a frame supported at its rear end on a pair of ground wheels and at its forward end by a hitch connectable to the drawbar of a tractor or the like, a rotatable rake reel connected to and suspended beneath said frame and extending for rotation on an axis diagonal to the line of draft of said frame, said reel having a rear end and a forward end, each ground wheel of said pair of wheels being positioned rearwardly of said reel and in close proximity thereto, said pair of wheels being rotatable about fixed parallel axes transverse to said line of draft and spaced in both a lateral and a forward-rear direction, one of said pair of wheels being proximate to said reel forward end, the other of said pair of wheels being proximate to said reel rear end, a drive shaft carried on each of said wheels, pawl and ratchet drive means connecting each wheel to its respective drive shaft, means including universal joints connecting the drive shaft on said one wheel to the drive shaft on said other wheel, and means connecting the drive shaft on said other of said wheels to said reel rear end.

10. A side delivery rake comprising a V-shaped frame disposed with the apex of the V forward and the ends of legs of the V rearward, one leg end being rearward of the other leg end, a ground wheel connected to each of said leg ends and supporting the rear of said frame above the ground, a hitch fastened to said apex for connection to the drawbar of a tractor or the like, a rotatable reel connected to and suspended beneath said frame and extending diagonally relative to the line of draft of said frame, a stabilizer bar connected between said one leg end and a forward portion of said reel to hold said reel in position relative to said frame, each supporting wheel of said pair of wheels being rearward of said reel and in close proximity thereto, said pair of wheels being rotatable about fixed parallel axes transverse to said line of draft and spaced in both a lateral and a forward-rear direction, and drive means connected between both of said wheels and said rake reel whereby when said wheels are rotated said reel is rotated.

References Cited in the file of this patent
UNITED STATES PATENTS

| | | |
|---|---|---|
| 2,681,543 | Richey | June 22, 1954 |
| 2,708,822 | Sutherland | May 24, 1955 |
| 2,746,233 | McClellan et al. | May 22, 1956 |